J. F. POOL.
Grain Winnower.
No. 86,099.
2 Sheets—Sheet 1.
Patented Jan. 19, 1869.
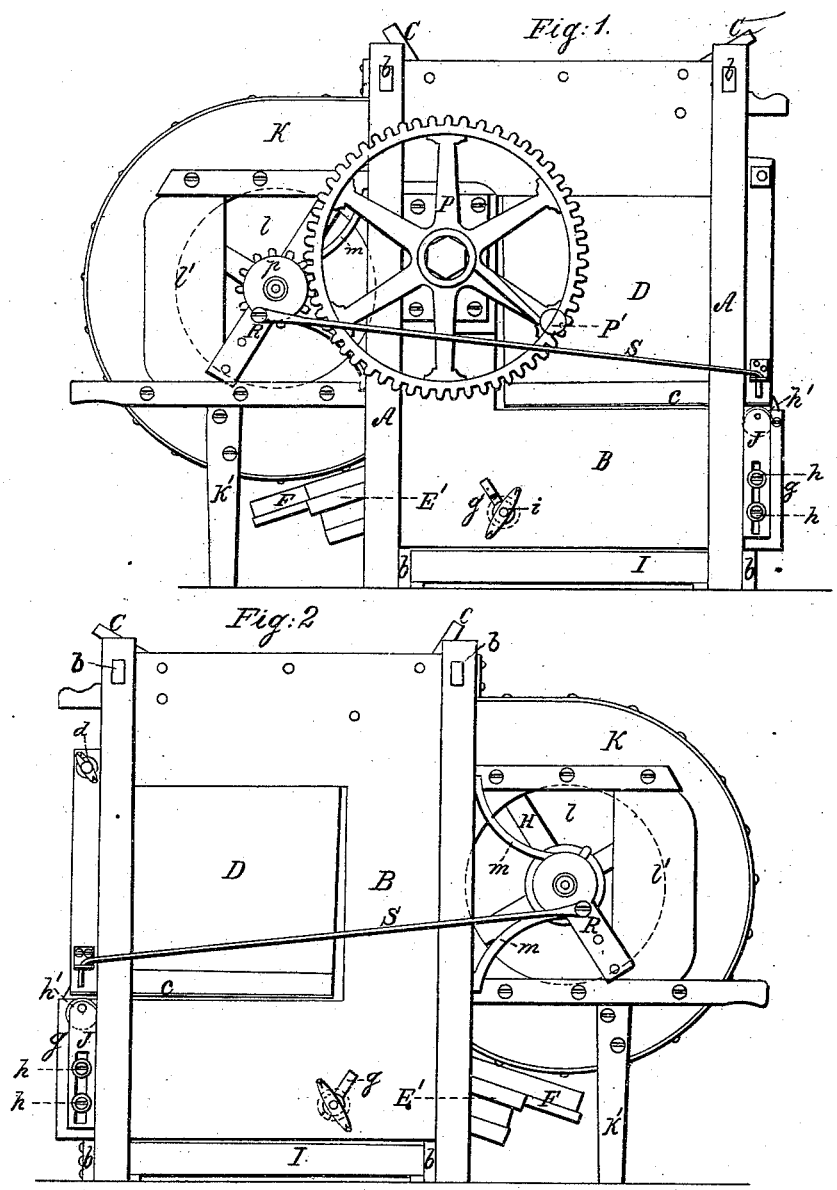

J. F. POOL.

Grain Winnower.

No. 86,099.

2 Sheets—Sheet 2.

Patented Jan. 19, 1869.

Witnesses:

Inventor:

United States Patent Office.

J. F. POOL, OF MONROE, WISCONSIN.

Letters Patent No. 86,099, dated January 19, 1869.

IMPROVEMENT IN FANNING-MILLS.

The Schedule referred to in these Letters Patent and making part of the same.

*To all whom it may concern:*

Be it known that I, J. F. POOL, of Monroe, in the county of Green, and State of Wisconsin, have invented certain new and useful Improvements in Fanning-Mills; and I do hereby declare that the following is a full, clear, and exact description thereof, reference being had to the accompanying drawings, and to the letters of reference marked thereon, which form a part of this specification, and in which—

Figure 3:
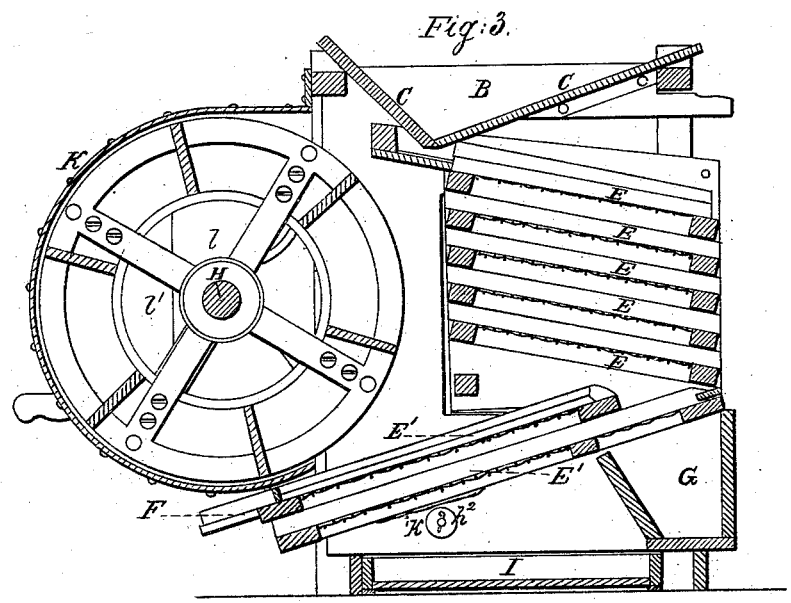

Figures 1 and 2 represent side views of my fanning-mill;

Figure 3, a central sectional view of the same; and

Figure 4:
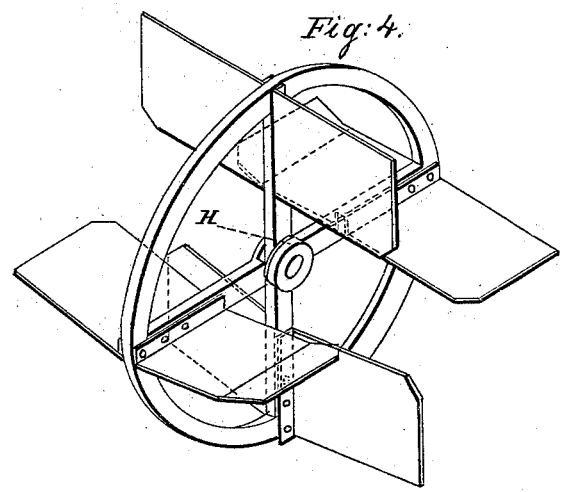

Figure 4, a perspective of a modification of the fanning-mill.

The nature of my invention consists in providing the lower side of the shaker of a fanning-mill, and also the lower one of the screens, situated directly beneath it, with metal plates or rails, serrated or roughed, and placed on rollers or wheels, made adjustable by means of slots and thumb or set-screws; the object of said arrangement being to communicate a jarring motion to the shaker and screens above described, and also permit of the raising or lowering and securing of the same at the desired point.

In the accompanying drawings—

A A represent standards or uprights, between and to the inner sides of which are secured boards B B.

These standards are held or braced together, a suitable distance apart, by bars or cross-pieces $b\ b$.

C is the hopper, one side of which is made removable.

D is the shaker, which works back and forth within the casing or boards B B, and in openings in the sides of said casing, as shown in figs. 1 and 2, and held together at its upper front end by a rod and thumb-screw, $d$.

The shaker D is supplied, on its inner side, with a number of screens, E E', the screens E' being made to incline inwardly, or in an opposite direction to those of E, and project out to the rear end of the mill.

The upper one of the screens E', upon which the wheat falls, is provided with a partition or piece running diagonally across the lower portion of its surface, and projecting or extending out with one of its sides, and leaving a space between them, so as to form a spout, F, for the removal of the fine wheat falling thereon.

The upper part of the lower one of the screens E' is designed to conduct the grass-seed into the box G, situated directly beneath its upper end, the screen E' being furnished, at this point, with a finer quality of grating than on its lower surface, which will receive all the second quality of grain or wheat, and any other grain falling therefrom will enter or drop into the sliding drawer I.

J J designate two movable standards or uprights, provided with slots extending nearly their entire length, and having passing through them screws $h\ h$, supplied with washers, and fastened or entering the lower front part of the casing.

These standards are supplied, at their upper ends, with rollers or wheels $h^1\ h^1$, upon which the serrated or roughed surface of the metal plates or rails $c\ c$, fastened to the lower side of the shaker D, move back and forth while the shaker is being operated, in order to give it a jarring motion, which will greatly facilitate the sifting or screening-process.

$h^2\ h^2$ are other rollers, whose axles pass through slots $g\ g$, in the lower rear ends of the casing B, and terminate on the outside of said casing into a screw, upon which fit washers $i$, formed with ears for operating them. (See figs. 1 and 2.)

These rollers are made to come in contact with the serrated surface of the metal rails $k$, secured to the lower side of the lower one of the screens E', for the purpose of giving a jarring motion to the said screens E'.

By means of the adjustable rollers $h^2\ h^2$ and $h^1\ h^1$, both the shaker D, with its screens, and the screens E', can be raised or lowered, as the case may require.

K designates a semicircular casing, secured to the rear side of the standards A A, and provided on each side with openings $l$, over a part of the surface of which slide doors $l'$.

The casing K is supported on legs $k'$, and provided on its inside with the fanning-wheel H, constructed as seen in fig. 3, or it may be made as seen in fig. 4, and secured to an axle which has its bearings in supports $m\ m$, secured to the standards A.

P is the driving-wheel, which is provided with the cranked-shaped handle P', and cogged on its circumference, so as to engage with a pinion, $p$, on the axle of the fanning-wheel H, for communicating motion to the fan.

R designates two cranks, secured to the outer ends of the axle of the fanning-wheel H, and supplied with a number of adjusting-holes, by which the connecting-rods S may be set nearer or further from the fanning-wheel, the opposite ends of said rods fitting into metal clips or plates, secured to the lower front ends of the shaker, on the side.

I do not claim the employment of rollers for supporting the shaker or the lower screen; but What I do claim as new, and desire to secure by Letters Patent, is—

1. The serrated metal plates or rails $c\ k$, secured to the shaker D, and the lower one of the screens E', in combination with the adjustable rollers $h^1\ h^2$, all arranged and operated substantially as and for the purpose set forth.

2. Providing the axle of the fanning-wheel H with the pinion $p$, gearing into the driving-wheel P, and the cranks R R, provided with adjusting-holes, for the purpose described, connecting-rods S S, and shaker D, all combined, constructed, arranged, and operated as set forth.

In testimony that I claim the foregoing as my own, I affix my signature, in presence of two witnesses.

J. F. POOL.

Witnesses:
S. W. ABBOTT,
W. H. PIERCE.